(12) United States Patent
Hanson et al.

(10) Patent No.: US 8,635,625 B2
(45) Date of Patent: Jan. 21, 2014

(54) POWER-AWARE WORKLOAD ALLOCATION IN PERFORMANCE-MANAGED COMPUTING ENVIRONMENTS

(75) Inventors: James Edwin Hanson, Yorktown Heights, NY (US); Jeffrey Owen Kephart, Cortlandt Manor, NY (US); Malgorzata Steinder, Leoma, NJ (US); Ian Nicholas Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 1335 days.

(21) Appl. No.: 12/062,923

(22) Filed: Apr. 4, 2008

(65) Prior Publication Data

US 2009/0254909 A1 Oct. 8, 2009

(51) Int. Cl.
*G06F 9/46* (2006.01)

(52) U.S. Cl.
USPC ............ 718/105; 718/100; 718/102; 718/104

(58) Field of Classification Search
USPC ........... 718/100, 101, 102, 104, 105; 713/320
See application file for complete search history.

(56) References Cited

U.S. PATENT DOCUMENTS

| 6,795,928 | B2 | 9/2004 | Bradley et al. | |
|---|---|---|---|---|
| 6,986,066 | B2 | 1/2006 | Morrow et al. | |
| 7,043,405 | B2 | 5/2006 | Orenstien et al. | |
| 7,174,467 | B1 * | 2/2007 | Helms et al. | 713/300 |
| 7,219,241 | B2 * | 5/2007 | Cooper et al. | 713/310 |
| 7,254,812 | B1 | 8/2007 | Menezes | |
| 7,272,517 | B1 | 9/2007 | Brey et al. | |
| 2003/0055969 | A1 * | 3/2003 | Begun et al. | 709/226 |
| 2004/0260489 | A1 * | 12/2004 | Mansingh et al. | 702/60 |
| 2005/0055590 | A1 * | 3/2005 | Farkas et al. | 713/320 |
| 2005/0076253 | A1 * | 4/2005 | Lu | 713/320 |
| 2006/0070060 | A1 * | 3/2006 | Tantawi et al. | 717/174 |
| 2006/0259621 | A1 * | 11/2006 | Ranganathan et al. | 709/226 |
| 2006/0288241 | A1 | 12/2006 | Felter et al. | |
| 2007/0101173 | A1 | 5/2007 | Fung | |
| 2008/0234873 | A1 * | 9/2008 | Gorbatov et al. | 700/291 |
| 2008/0301473 | A1 * | 12/2008 | Perez et al. | 713/300 |

(Continued)

OTHER PUBLICATIONS

Nathuji et al. "Exploiting Platform Heterogeneity for Power Efficient Data Centers", IEEE, Fourth Internation Conference on Autonomic Computing, 2007, pp. 1-10.*

(Continued)

*Primary Examiner* — Emerson Puente
*Assistant Examiner* — Willy W Huaracha
(74) *Attorney, Agent, or Firm* — Preston J. Young; Ryan, Mason & Lewis, LLP

(57) ABSTRACT

An exemplary method of allocating a workload among a set of computing devices includes obtaining at least one efficiency model for each device. The method also includes, for each of a set of allocations of the workload among the devices, determining, for each device, the power consumption for the device to perform the workload allocated to the device by the allocation, the power consumption being determined based on the at least one efficiency model for each device; and determining a total power consumption of the devices. The method also includes selecting an allocation of the workload among the devices based at least in part on the total power consumption of the devices for each allocation. The method also includes implementing the selected allocation of the workload among the devices.

20 Claims, 5 Drawing Sheets

(56) References Cited

U.S. PATENT DOCUMENTS

| | | | |
|---|---|---|---|
| 2009/0138219 A1* | 5/2009 | Bletsch et al. | 702/60 |
| 2009/0248976 A1* | 10/2009 | Rotithor | 711/113 |
| 2010/0250192 A1* | 9/2010 | Deokar et al. | 702/182 |

OTHER PUBLICATIONS

J.O. Kephart et al., "Coordinating Multiple Autonomic Managers to Achieve Specified Power-Performance Tradeoffs," in IEEE Intl. Conf. on Autonomic Computing, Jun. 2006, pp. 145-154.

J. Chase et al., "Managing Energy and Server Resources in Hosting Centers," In ACM Symposium on Operating Systems Principles, 2001, pp. 103-116.

X. Fan et al., "Power Provisioning for a Warehousesized Computer," in Proc. 34th Intl. Symposium on Computer Architecture (ISCA '07), 2007, pp. 13-23.

"IBM Websphere Extended Deployment V6.1 Data Sheet," (2007), Ftp://Ftp.Software.Ibm.Com/Software/Webserver/Appserv/Library/V61/Websphere_Extended_Deployment_V6.1_Data_Sheet.Pdf., 12 pages.

A. Karve et al., "Dynamic Placement for Clustered Web Applications," In World Wide Web Conference, Edinburgh, Scotland, May 2006, 10 pages.

G. Pacifici et al., "Dynamic Estimation of CPU Demand of Web Traffic," In Valuetools, Pisa, Italy, Oct. 2006, 17 pages.

G. Pacifici et al., "Performance Management for Cluster Based Web Services," Journal of Network and Systems Management, vol. 23, No. 12, 2005, 17 pages.

G. Pacifici et al., "Managing the Response Time for Multi-Tiered Web Applications," IBM Tech. Rep. Tech. Rep. RC 23651, 2005, 15 pages.

C. Tang et al., "A Scalable Application Placement Controller for Enterprise Data Centers," In World Wide Web Conference, Banff, Alberta, Canada, May 2007, 10 pages.

P. Bohrer et al., "The Case for Power Management in Web Servers," In Power Aware Computing, Graybill and Melhem, Eds. Kluwer Academic Publications, 2002, 31 pages.

M. Elnozahy et al., "Energy Conservation Policies for Server Clusters," In 4th Usenix Symposium on Internet Technologies and Systems, Seattle, Wa, Mar. 2003, 15 pages.

P. Pillai et al., "Real-Time Dynamic Voltage Scaling for Lowpower Embedded Operating Systems," In ACM Symposium on Operating Systems Principles, 2001, pp. 89-102.

M. Wang et al., "Adaptive Performance Control of Computing Systems Via Distributed Cooperative Control: Application to Power Management in Computing Clusters," in IEEE Intl. Conf. on Autonomic Computing, Jun. 2006, pp. 165-174.

M. Elnozahy et al., "Energy-Efficient Server Clusters," In 2nd Workshop on Power Aware Computing Systems (In Conjunction With HPCA), Feb. 2002, 18 pages.

Y. Chen et al., "Managing Server Energy and Opeational Costs in Hosting Centers," In Proc. Intl. Conf. on Measurement and Modeling of Computer Systems (Sigmetrics'05), 2007, pp. 303-314.

N. Bobroff et al., "Dynamic Placement of Virtual Machines for Managing SLA Violations," In Integrated Network Management, Munich, Germany, May 2007, pp. 119-128.

C.-H. Tsai et al., "Online Web Cluster Capacity Estimation and Its Application to Energy Conservation," IEEE Transactional on Parallel and Distributed Systems, vol. 18, No. 7, pp. 932-945, 2007.

* cited by examiner

POWER-AWARE WORKLOAD ALLOCATION IN PERFORMANCE-MANAGED COMPUTING ENVIRONMENTS

FIELD OF THE INVENTION

The present invention relates generally to system management, and more particularly relates to techniques for allocating a workload among a set of computing devices.

BACKGROUND OF THE INVENTION

Performance-management systems such as WebSphere XD (commercially available from International Business Machines, Armonk, N.Y.) operate by distributing workload across a collection of servers in order to meet (or exceed) performance goals set by administrators. Heretofore, the cost of the electrical power used to run the servers has not been taken into account in distributing workload across servers.

Rather, prior methods of combining power- and performance-considerations have focused on modifying servers' operational characteristics. Dynamic voltage scaling permits a reduction of power usage by lowering processor voltage at times of low CPU utilization. Dynamic frequency scaling reduces clock frequency, permitting the CPU to consume less power. Server consolidation involves consolidating workloads onto a minimal number of servers then powering off spare server machines. The decision whether to power a server on or off is made based on, for example, the operating frequency of currently running servers.

All of these known methods, however, presuppose a certain level of control over the servers' power usage. This control is not universally available, however; nor is it without cost even where available (e.g., it generally requires the use of special-purpose software). For this reason, it is desirable to have a system in which power-usage may be reduced without the need for modifying the servers themselves.

SUMMARY OF THE INVENTION

An exemplary method of allocating a set of workload among a set of computing devices includes obtaining at least one efficiency model for each device. The method also includes, for each of a set of allocations of the workload among the devices, determining, for each device, the power consumption for the device to perform the workload allocated to the device by the allocation, the power consumption being determined based on the at least one efficiency model for each device; and determining a total power consumption of the devices. The method also includes selecting an optimal allocation of the workload among the devices based at least in part on the total power consumption of the devices for each allocation. The method also includes implementing the selected allocation of the workload among the devices.

Illustrative embodiments of the present invention advantageously provide an improved performance-management system that incorporates information about the efficiency of computing devices into a workload-allocation algorithm in order to reduce overall cost of electrical power usage without unduly affecting overall system performance and/or while making intelligent tradeoffs between power usage and performance.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
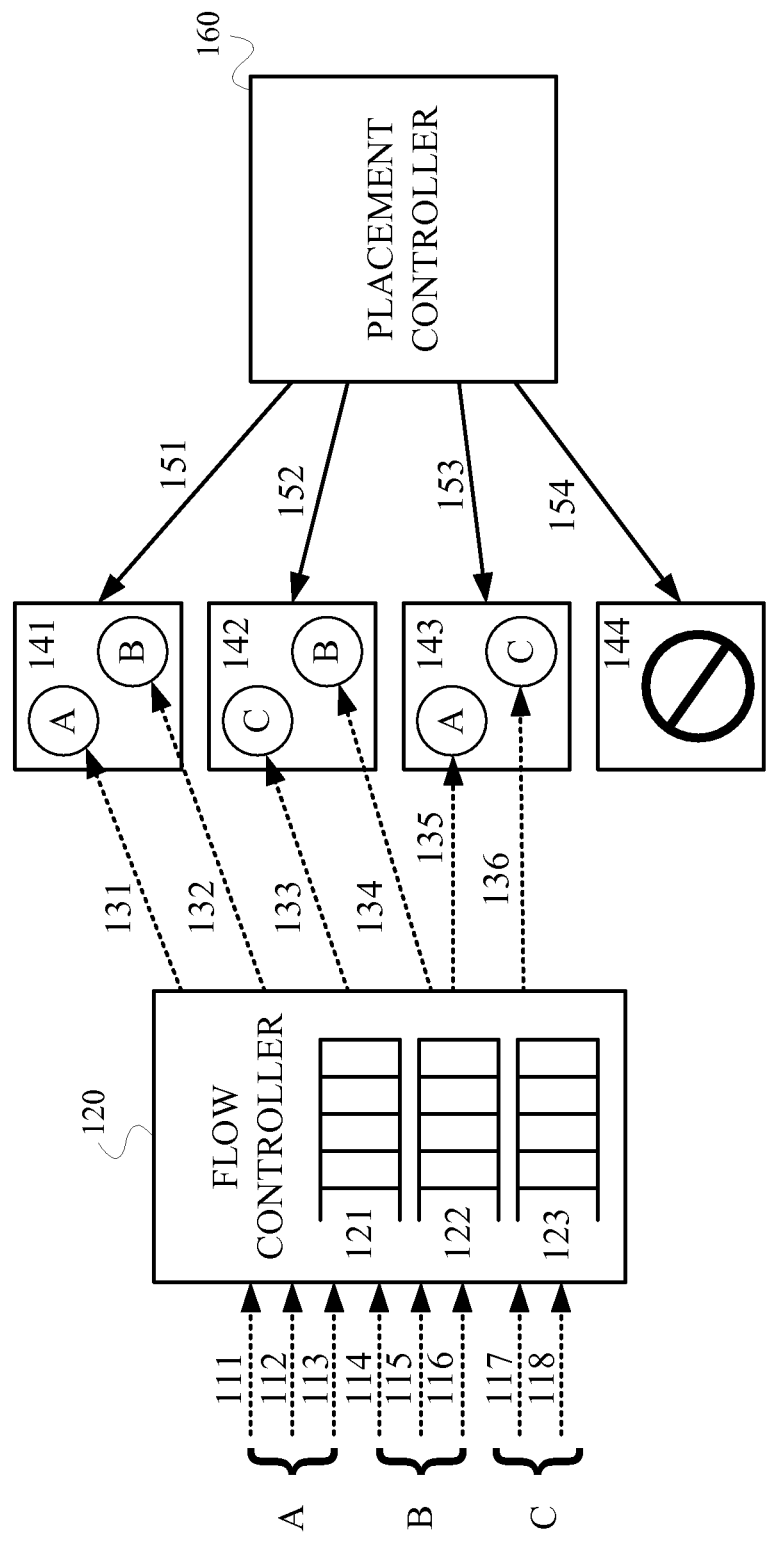
FIG. 1 shows an exemplary system with which an embodiment of the present invention may be used.

Although the present invention will be described herein primarily with regard to an exemplary embodiment wherein client requests and web applications are allocated among a cluster of servers, it should be understood that inventive techniques may be applicable to allocating any type of work unit (including, but not limited to, one or more requests, transactions, files, packets, records, etc.) and application (including, but not limited to, one or more threads and/or standalone or distributed processes) among any number of servers, processors, computers, terminals, switches, routers, or other computing devices.

Moreover, although described herein primarily with reference to a piecewise-linear efficiency model derived using linear regression, other forms and/or regression techniques (including more complex forms and non-linear regressions) may also be used in conjunction with exemplary embodiments of the inventive methodologies described herein, as will be appreciated by one skilled in the art.

Furthermore, as will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows an exemplary system with which an embodiment of the present invention may be used. In particular, this system comprises a cluster of server machines 141, 142, 143 and 144, operative to run applications A, B and C. Server 141 is running applications A and B. Server 142 is running applications B and C. Server 143 is running applications A and C. Server 144 is not running any of applications A, B and C; it may be either idle or powered off.

Each application may be replicated for high-availability and performance to multiple server machines. Application A is running on servers 141 and 143. Application B is running on servers 141 and 142. Application C is running on servers 142 and 143. The set of all replicas of a given application (here called the instances of the application) constitutes its application cluster. Application clusters may arbitrarily overlap on physical machines.

Placement controller 160 is operative to control the placement of applications by starting and stopping individual instances of that application on one or more of servers 141, 142, 143 and 144 via signals 151, 152, 153 and 154, respectively. Application placement may be changed dynamically based on workload intensity and application service level agreements (SLAs). Controller 160 preferably periodically evaluates the placement of applications and modifies it to better optimize the allocation of such resources as CPU and memory capacity, as well as various other constraints such as allocation restrictions, collocation restrictions, affinity constraints, minimum and maximum number of instances for each application, etc. Conventional aspects of an exemplary controller suitable for use with this invention are described in, for example, A. Karve et al., "Dynamic placement for clustered web applications," in World Wide Web Conference, Edinburgh, Scotland, May 2006, the disclosure of which is incorporated by reference herein.

Each application may receive requests, which may comprise not only the client requests described herein, but more generally refers to any work unit to be processed by one or more application. Each application may receive a certain number of requests, which varies over time. For example, there may be three requests 111-113 for application A, three requests 114-116 for application B, and two requests 117, 118 for application C. Requests 111-118 are received by flow controller 120, which may place incoming requests in queues for each application, such as queue 121 for application A, queue 122 for application B, and queue 123 for application C. The flow controller dispatches 131-136 these requests from queues 121-123 to applications running on server machines 141-144.

Flow controller 120, which may be, for example, an L7 proxy router, preferably dispatches the queues so as to regulate the workload (and hence the CPU usage) of the server machines in order to prevent overload, as well as to meet application SLAs (service level agreements), which may be defined in terms of, for example, average response times or throughput requirements. In a preferred embodiment, the dispatching is done based on a weighted-fair round robin scheduling discipline. However, the flow controller is limited by the current placement of application instances, which introduces constraints on the amount of CPU capacity that may be used by each application. Conventional aspects of an exemplary controller suitable for use with this invention are described in, for example, G. Pacifici et al., "Performance management for cluster based web services," Journal of Network and Systems Management, vol. 23, no. 12, 2005, the disclosure of which is incorporated by reference herein.

Even though they jointly solve the same optimization problem of allocating workload among servers, the flow and placement controllers are preferably separate entities working on different time scales. Flow controller 120 preferably readjusts queue dispatching weights every 15-30 seconds, which ensures rapid response to workload intensity changes. Placement controller 160 is readjusted every several to tens of minutes, as placement changes are typically heavy-weight and time consuming. However, flow controller 120 and placement controller 160 may also be implemented using a single entity or may even be combined with other entities, such as one or more of servers 141-144.

As used herein, the "efficiency" of a computing device is defined as the ratio of the amount of work (e.g., processing) performed by the device to the amount of electrical power consumed by the device. It is commonly expressed in terms of the rate of processing (usually measured in MHz of CPU usage) divided by the rate of power consumption (usually measured in watts). Furthermore, as used herein, the "workload" of a server comprises the one or more requests handled by the one or more applications on that server. The workload is hence a function of the applications running on that server as well as the requests sent to that server. Moreover, the CPU usage is directly related to the workload of the server; a heavier workload requires greater of the CPU.

The power consumption (and hence, efficiency) of individual servers may vary significantly from the nominal "nameplate" values, even for servers of the identical model. For example, among a small sample of (supposedly) identical blade servers, running identical workloads, the power-usage of the different blades may differ by several per cent. In addition to the hardware model of a server, the power usage of an individual server may also be influenced by its operating temperature, age and history. It may be slightly influenced by the type of the workload (e.g., whether it uses I/O or CPU more heavily).

However, for a given server running a given type of workload and operating at a given temperature, the CPU usage level (which is largely dependent on the workload allocated to the server) typically correlates extremely well with the power usage level. In other words, there is a well-defined power-vs.-performance curve. Moreover, the overall shape of this curve is common across servers, workload types and temperatures. Indeed, it is generally at least piecewise linear in the absence of a frequency or voltage adjustment.

Figure 2:
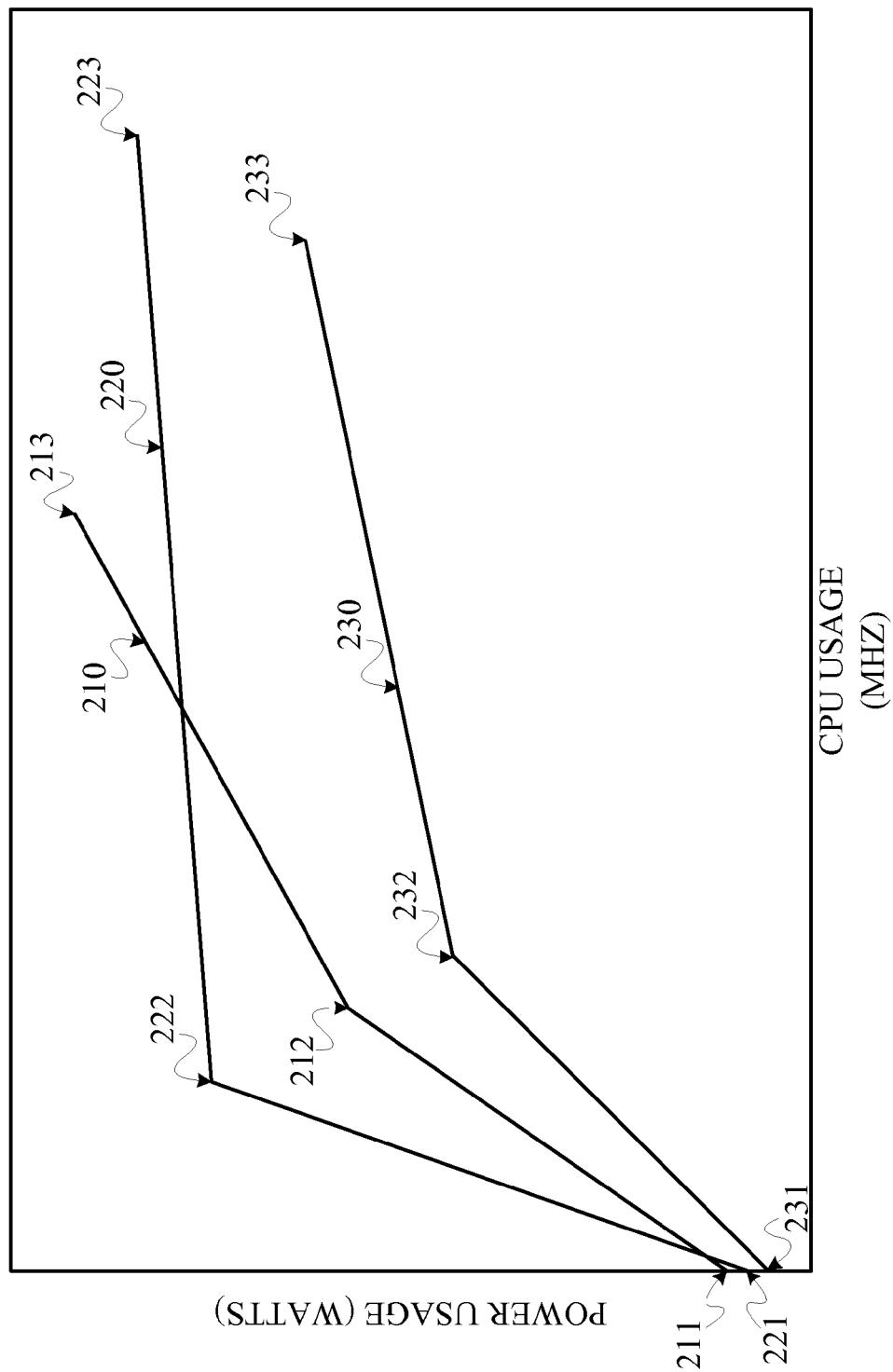
FIG. 2 schematically shows exemplary efficiency models suitable for use with an embodiment of the invention.

FIG. 2 schematically shows exemplary efficiency models suitable for use with an embodiment of the invention. More specifically, FIG. 2 shows exemplary power-performance curves 210, 220 and 230 for three different servers. As can be seen, each of curves 210, 220 and 230 is piecewise linear between respective points 211, 221 and 231 (representing power consumption when the server is powered off) and 212, 222 and 232 (representing power consumption when the server is powered on but is idle, e.g., with no workload), as well as between respective points 212, 222 and 232 and 213, 223 and 233 (representing power consumption when the server is fully busy with a maximal workload).

It is often possible to characterize the efficiency of a server by means of a relatively small number of measurements. For example, where the power-performance curve is well-approximated by a piecewise linear function, for a given workload and temperature, only two data points (e.g., power usage when the server is idle and when the server is running one or more workload) need to be measured; a linear regression can then be used to interpolate and extrapolate other data points. For more complex forms, nonlinear regression or other such techniques may be used for interpolation and extrapolation. Efficiency models may be provided to the system in advance, but are preferably obtained (and updated) by direct measurements taken from time to time.

Figure 3:
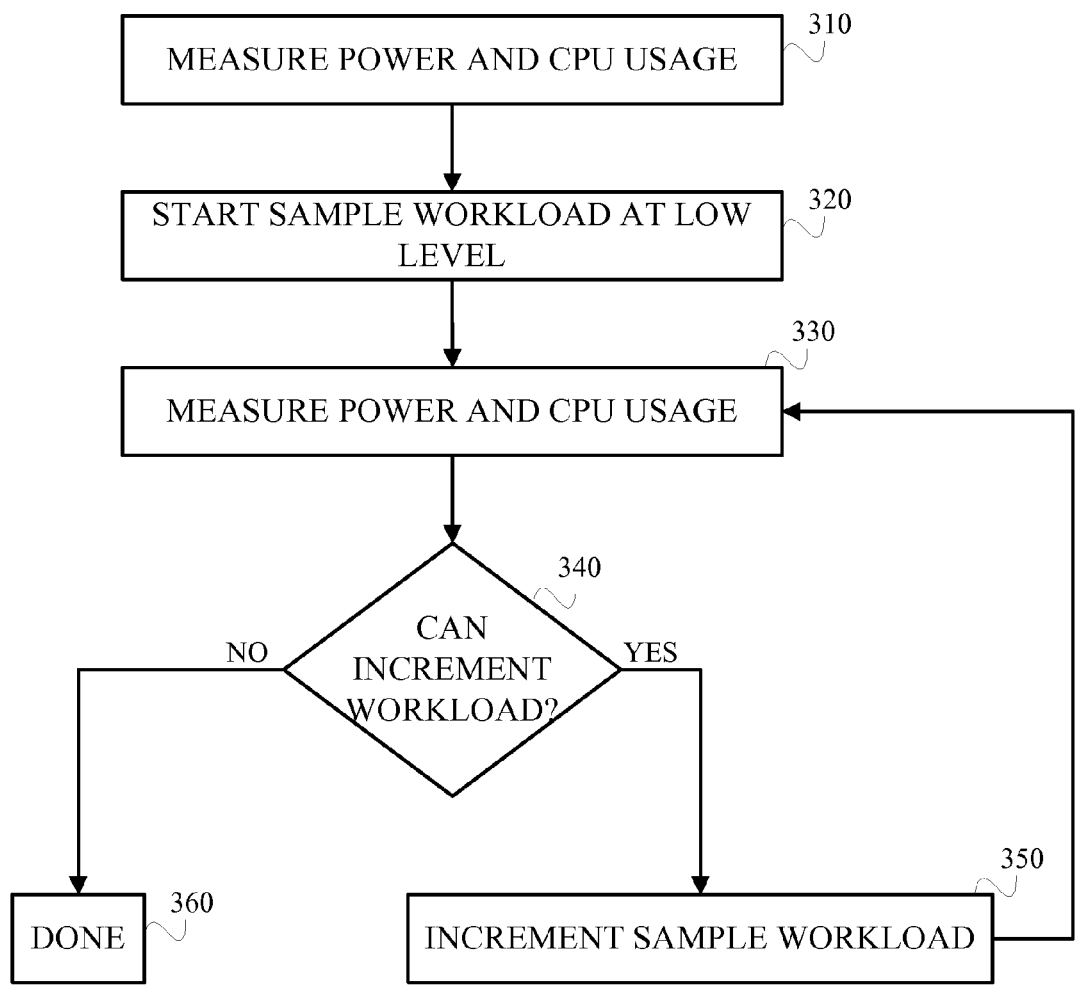
FIG. 3 shows an exemplary method for obtaining one or more efficiency models for a server.

FIG. 3 shows an exemplary method for obtaining and/or updating one or more efficiency models for a server. First, in step 310, the power and CPU usage of the server is measured. Preferably, this is done when the server is idle (e.g., no workload allocated to it). In step 320, a workload is allocated to the server. Preferably, this is a relatively small sample workload. In step 330, the power and CPU usage are measured again.

In step 340, a determination is made as to whether the sample workload may be incremented. If so, the sample workload may be incremented by allocating additional applications and/or requests to the server. If the workload cannot be increased (e.g., because the server is at its maximum capacity or because allocating a higher workload would be detrimental to other goals), then the process ends in step 360, where a regression may be performed on the measurements in order to interpolate and extrapolate an efficiency model.

Figure 4:
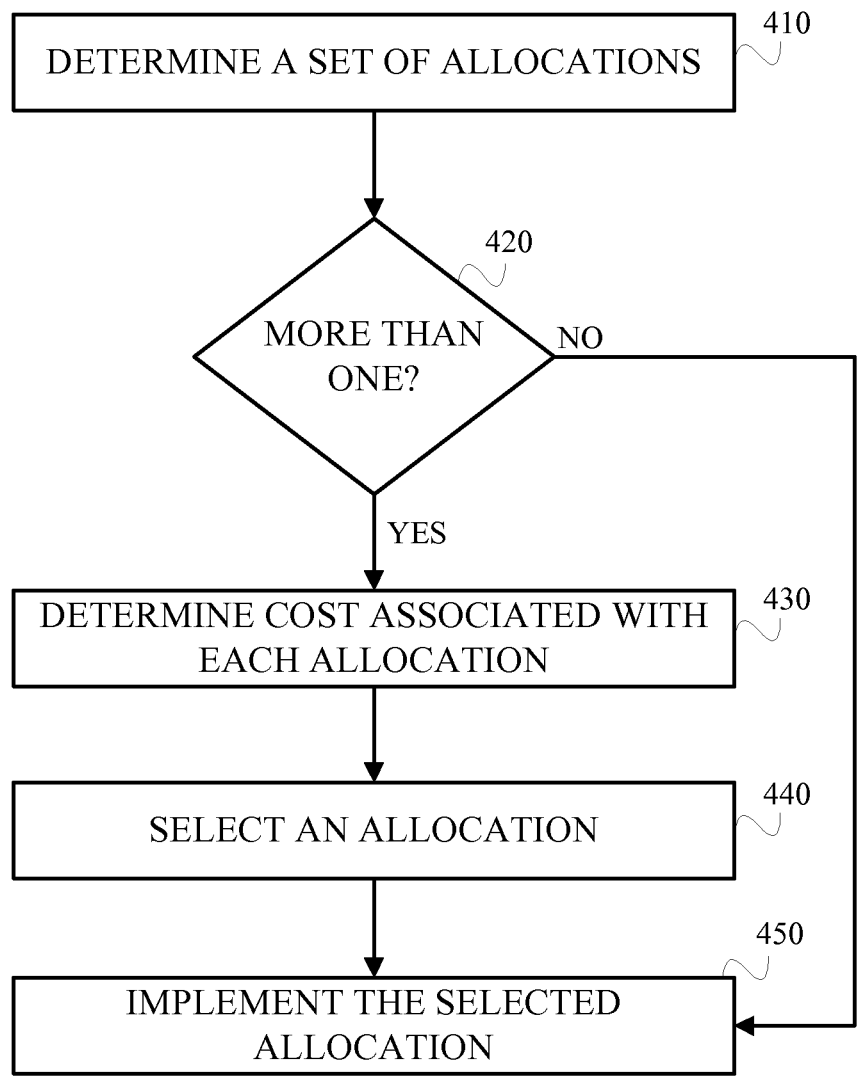
FIG. 4 shows an exemplary method for allocating a set of workload among a set of servers.

FIG. 4 shows an exemplary method for allocating a workload among a set of servers. In step 410, a set of possible allocations of a workload among servers is calculated without considering power usage. An allocation of workload may include allocations of applications and/or requests to the servers. This set of allocations preferably includes only allocations which satisfy other constraints, such as CPU and memory capacity, as well as various other constraints such as allocation restrictions (e.g., an application may be only runnable on a subset of server machines that match its requirements), collocation restrictions, affinity constraints (e.g., it may be impossible to remove some application instances from a server due to potential loss of state or the cost of migration to a different server), minimum and maximum number of instances for each application. This set of allocations may be, but need not be, limited to only those allocations which will allow a level of performance for each application which satisfies one or more SLAs.

In step 420, if the set of allocations has only one allocation (e.g., there is only one allocation which satisfies the constraints), then that allocation is implemented in step 450. Otherwise, in step 430, a total cost is calculated for each allocation within step 410. This cost includes a cost associated with the total power consumption of all servers under a given allocation, which may be computed by using the efficiency model to determine the power required for each server based on the workload allocated to that server in a given allocation. This cost preferably includes not only the direct cost of the power, but also indirect costs, such as the cost of cooling the servers, and the cost of wear-and-tear on the servers. This cost may also include a cost associated with failing to meet an SLA in order to consider "efficient breaches" of an SLA (e.g., where it is cheaper to violate an SLA than to fulfill it).

In step 440, an allocation is selected. Although the selected allocation could be merely the allocation with the lowest cost, it may be desirable to also consider the tradeoff between application performance and cost. For example, one may wish to maximize a utility function defined as a difference between a value associated with a performance metric of each application (based on, for example, the payments and penalties specified in the SLAs) and the cost of an allocation.

However, although allocations according to a utility function that sums over individual application value functions may result in an optimal power-performance tradeoff, such an approach often unduly favors the applications that are deemed more "important", often starving applications with lower value to the point where their SLAs are violated dramatically. The resulting system behavior can be hard to predict and analyze. Moreover, system administrators tend to expect "fair" resource allocation, in which all applications are doing approximately equally well in meeting their SLA goals, i.e. the performance values are roughly the same. Thus, it may be preferably to select an allocation according to a max-min optimization over that allocation.

In step 450, the selected allocation of workload among the servers is implemented. This may include, for example, starting and/or stopping applications on servers (for example, by placement controller 160 in FIG. 1) or modifying the distribution of requests to servers by, for example, modifying dispatching weights assigned to queues of a flow controller (e.g., queues 121, 122, 123 of flow controller 120 in FIG. 1).

Figure 5:
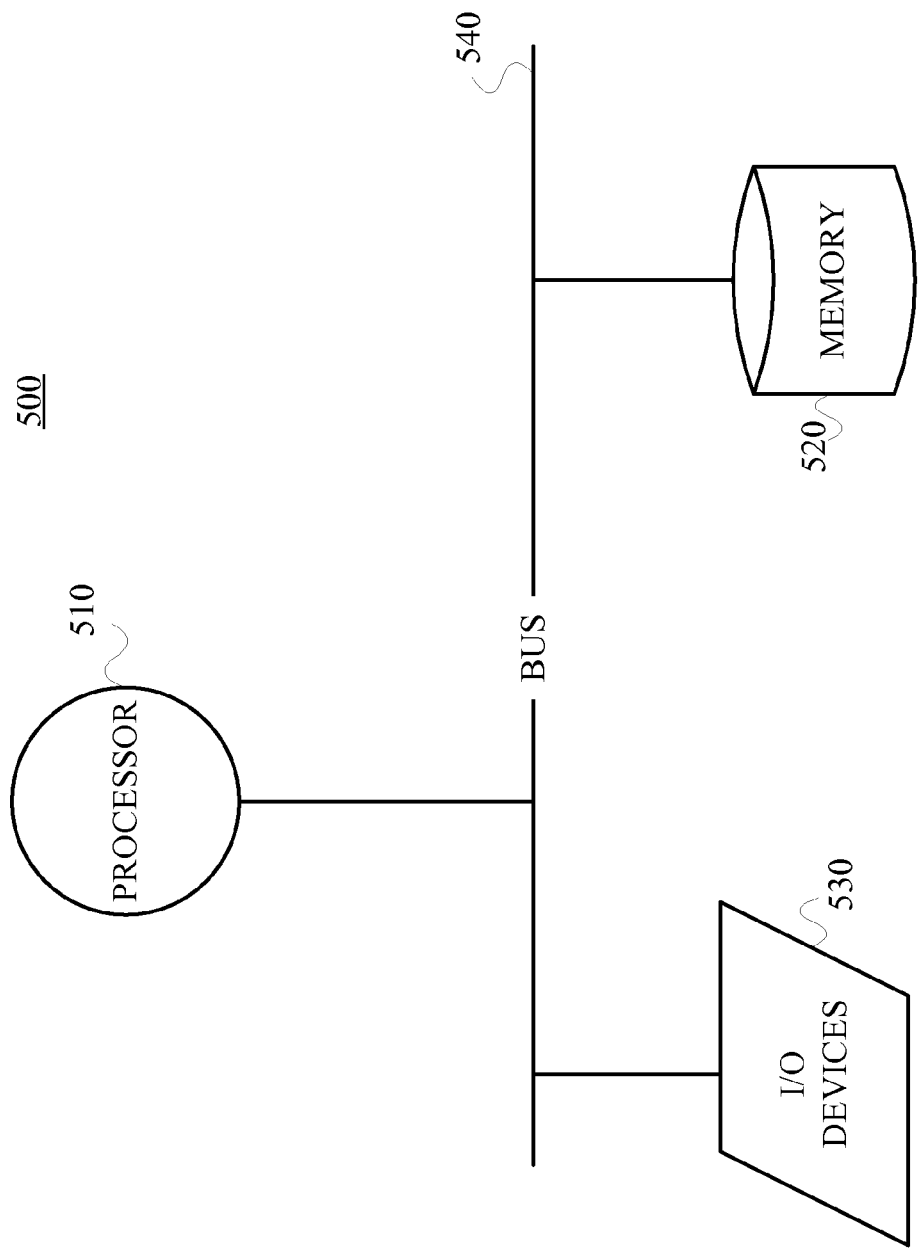
FIG. 5 is a block diagram depicting an exemplary processing system in which inventive techniques may be implemented.

The methodologies of embodiments of the invention may be particularly well-suited for use in an electronic device or alternative system. For example, FIG. 5 is a block diagram depicting an exemplary processing system 500 formed in accordance with an aspect of the invention. System 500 may include a processor 510, memory 520 coupled to the processor (e.g., via a bus 540 or alternative connection means), as well as input/output (I/O) circuitry 530 operative to interface with the processor. The processor 510 may be configured to perform at least a portion of the methodologies of the present invention, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 510. In any case, it is to be appreciated that at least a portion of the components shown in the above figures may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A processor-implemented method of allocating a workload among computing devices, comprising the steps of:
   obtaining at least one efficiency model for each computing device, wherein obtaining the at least one efficiency model comprises executing a sample workload in increments on at least one of the computing devices, and measuring power and processor usage for each increment of execution of the sample workload;
   determining a set of allocations of the workload among the computing devices;
   for each of the set of allocations of the workload among the computing devices, determining, for each computing device, the power consumption for the computing device to perform the workload allocated to the computing device by the allocation, the power consumption being determined based on the at least one efficiency model for each computing device; and determining a total power consumption of the computing devices;
   selecting an allocation from the set of allocations based at least in part on the total power consumption of the computing devices for each allocation; and
   implementing the selected allocation of the workload among the computing devices.

2. The processor-implemented method of claim 1, wherein the set of allocations is limited to allocations which satisfy one or more constraints.

3. The processor-implemented method of claim 1, wherein selecting an allocation comprises:
   determining a cost of each allocation based at least in part on a cost associated with the total power consumption of each allocation; and
   selecting the allocation with the lowest cost.

4. The processor-implemented method of claim 1, wherein implementing the selected allocation of the workload among the computing devices comprises modifying at least one placement of applications on the computing devices.

5. The processor-implemented method of claim 1, wherein implementing the selected allocation of the workload among the computing devices comprises modifying at least one distribution of requests to the computing devices.

6. The processor-implemented method of claim 1, wherein obtaining at least one efficiency model for each computing device comprises obtaining at least one predetermined efficiency model for at least one computing device.

7. The processor-implemented method of claim 1, wherein obtaining at least one efficiency model for each computing device comprises determining at least one efficiency model for at least one computing device.

8. The processor-implemented method of claim 7, wherein determining at least one efficiency model for at least one computing device comprises:
   measuring at least a first power consumption of the computing device when at least a first set of workload are allocated to the computing device;
   measuring at least a second power consumption of the computing device when at least a second set of workload are allocated to the computing device; and
   performing a regression on the measured power consumptions.

9. The processor-implemented method of claim 8, wherein determining at least one efficiency model for at least one computing device comprises:
   measuring a first power consumption of the computing device when no workload is allocated to the computing device;
   allocating a given workload among the computing device;
   measuring at least a second power consumption of the computing device when the given workload is allocated to the computing device; and
   performing a regression on the measured power consumptions.

10. An apparatus for allocating a workload among computing devices, the apparatus comprising:
   at least one memory; and
   at least one processor operatively coupled to the at least one memory, the processor being operative to perform the operations of:
      obtaining at least one efficiency model for each computing device, wherein obtaining the at least one efficiency model comprises executing a sample workload in increments on at least one of the computing devices, and measuring power and processor usage for each increment of execution of the sample workload;
      determining a set of allocations of the workload among the computing devices;
      for each of the set of allocations of the workload among the computing devices, determining, for each computing device, the power consumption for the computing device to perform the workload allocated to the computing device by the allocation, the power consumption being determined based on the at least one efficiency model for each computing device; and determining a total power consumption of the computing devices;
      selecting an allocation from the set of allocations based at least in part on the total power consumption of the computing devices for each allocation; and
      implementing the selected allocation of the workload among the computing devices.

11. The apparatus of claim 10, wherein selecting the allocation comprises:
   determining a cost of each allocation based at least in part on a cost associated with the total power consumption of each allocation; and
   selecting the allocation with the lowest cost.

12. The apparatus of claim 10, wherein allocating the workload among the computing devices according to the selected allocation comprises modifying at least one placement of applications on the computing devices.

13. The apparatus of claim 10, wherein allocating the workload among the computing devices according to the selected allocation comprises modifying at least one distribution of requests to the computing devices.

14. The apparatus of claim 10, wherein obtaining at least one efficiency model for at least one computing device comprises:
   measuring at least a first power consumption of the computing device when at least a first set of workload are allocated to the computing device;
   measuring at least a second power consumption of the computing device when at least a second set of workload are allocated to the computing device; and
   performing a regression on the measured power consumptions.

15. A computer program product for allocating a set of workload among computing devices, the computer program product comprising a non-transitory computer usable medium having computer usable program code embodied therewith, the computer usable program code comprising computer usable program code configured to perform the operations of:
   obtaining at least one efficiency model for each computing device, wherein obtaining the at least one efficiency model comprises executing a sample workload in increments on at least one of the computing devices, and measuring power and processor usage for each increment of execution of the sample workload;
   determining a set of allocations of the workload among the computing devices;
   for each of the set of allocations of the workload among the computing devices, determining, for each computing device, the power consumption for the computing device to perform the workload allocated to the computing device by the allocation, the power consumption being determined based on the at least one efficiency model for each computing device; and determining a total power consumption of the computing devices;
   selecting an allocation from the set of allocations based at least in part on the total power consumption of the computing devices for each allocation; and
   implementing the selected allocation of the workload among the computing devices.

16. The computer program product of claim 15, wherein selecting the optimal allocation comprises:
   determining a cost of each allocation based at least in part on a cost associated with the total power consumption of each allocation; and
   selecting the allocation with the lowest cost.

17. The computer program product of claim 15, wherein implementing the selected allocation of the workload among the computing devices comprises modifying at least one placement of applications on the computing devices.

18. The computer program product of claim 15, wherein implementing the selected allocation of the workload among the computing devices comprises modifying at least one distribution of requests to the computing devices.

19. The computer program product of claim 15, wherein obtaining at least one efficiency model for each computing device comprises obtaining at least one predetermined efficiency model for at least one computing device.

20. The computer program product of claim 15, wherein obtaining at least one efficiency model for at least one computing device comprises:
- measuring at least a first power consumption of the computing device when at least a first set of workload are allocated to the computing device;
- measuring at least a second power consumption of the computing device when at least a second set of workload are allocated to the computing device; and
- performing a regression on the measured power consumptions.

\* \* \* \* \*